Patented Sept. 10, 1940

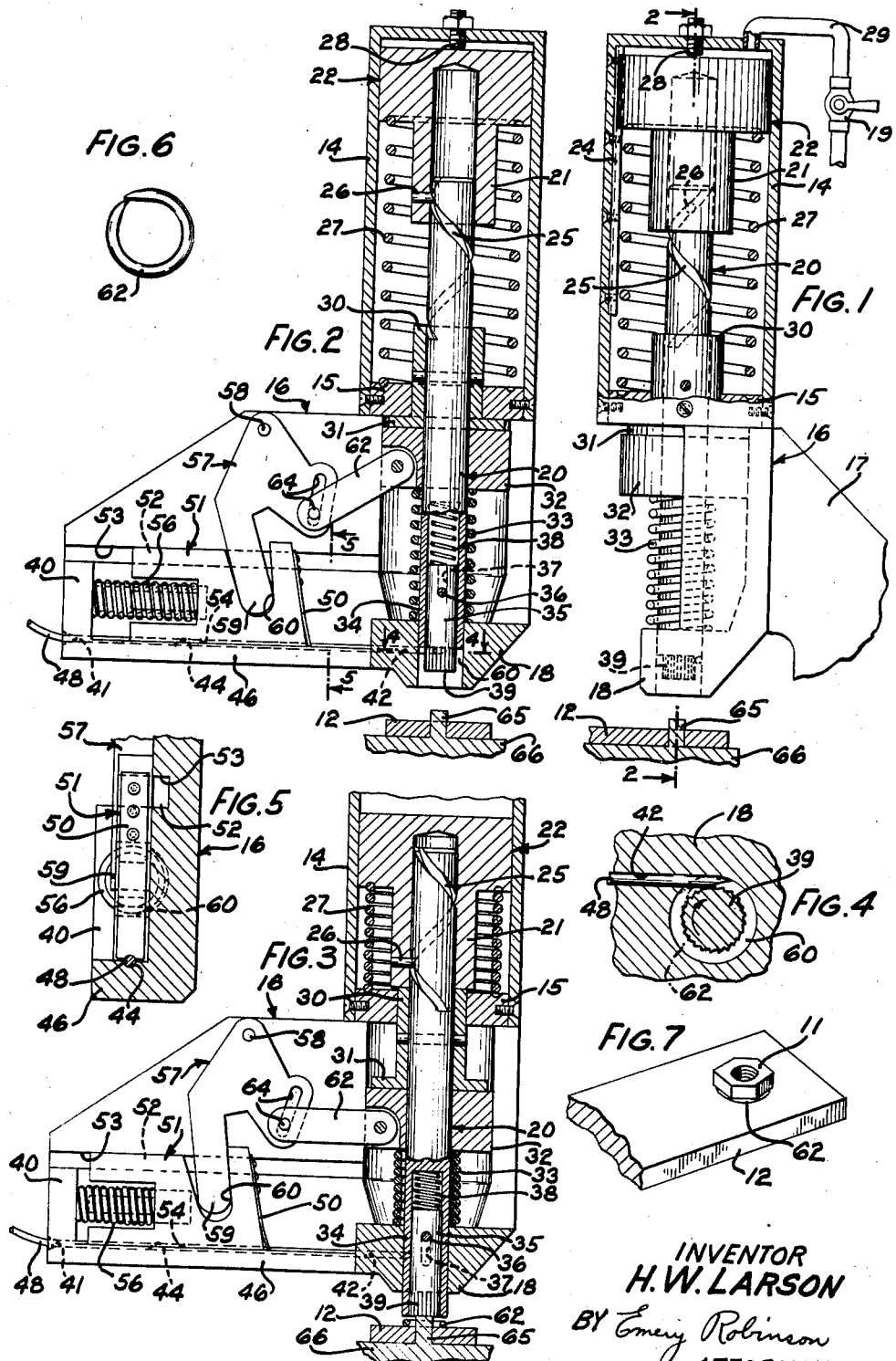

2,214,025

UNITED STATES PATENT OFFICE 2,214,025

WIRE FORMING APPARATUS

Homer W. Larson, Downers Grove, Ill., assignor to Western Electric Company, Incorporated, New York, N. Y., a corporation of New York Application March 4, 1939, Serial No. 259,719

8 Claims. (Cl. 140—88)

This invention relates to wire forming apparatus, and more particularly to apparatus for forming solder rings from a continuous length of solder wire.

An object of the invention is to provide a simple, inexpensive and efficient apparatus for forming wire rings from a continuous length of wire.

One embodiment of the invention contemplates the provision of an apparatus for forming rings of solder wire from a continuous length of solder wire, wherein the free end of the solder wire is intermittently fed to a winding arbor or mandrel which is intermittently rotated through approximately one revolution, after which the formed ring of solder wire is severed from the continuous length and stripped from the mandrel.

Other features and advantages of the invention will become apparent from the following detailed description when read in conjunction with the accompanying drawing, in which Fig. 1 is a side view, partly in section, of a solder ring forming apparatus embodying the invention;

Fig. 2 is a fragmentary vertical section on line 2—2 of Fig. 1;

Fig. 3 is a sectional view similar to Fig. 2 with the several parts shown in the positions occupied by them immediately after the completion of a soldering ring;

Fig. 4 is an enlarged detail section on line 4—4 of Fig. 2;

Fig. 5 is an enlarged fragmentary section on line 5—5 of Fig. 2;

Fig. 6 is an enlarged plan view of a ring of solder wire produced by the apparatus of the present invention, and Fig. 7 illustrates how such a ring of solder wire may be employed for soldering a nut to a metal strip.

The apparatus illustrated in the drawing may be used advantageously for making small rings of solder wire, such as illustrated in Fig. 6, from a continuous length of solder wire. Such rings of solder wire may be useful for many purposes, for example, for soldering a nut 11 to a metal strip 12, as shown in Fig. 7. The invention, however, is obviously capable of other applications.

As shown in the drawing, the apparatus comprises a vertical cylinder 14, the lower end of which surrounds and is rigidly attached to a circular bearing portion 15 of a supporting bracket 16. The bracket is attached to the upper end of an upstanding arm 17, a portion of which is shown in Fig. 1. By means of the arm 17 the apparatus is attachable to a suitable table or pedestal (not shown).

The supporting bracket is formed with a second bearing portion 18 spaced below the bearing portion 15, and the two bearing portions are provided with vertically aligned circular apertures for slidably and rotatably accommodating a vertical shaft 20. The upper end of this shaft is slidable and rotatable in a downwardly projecting tubular portion 21 of a reciprocatory piston 22. The piston is vertically slidable within the upper portion of the cylinder, but is prevented from turning therein by a key 24 (Fig. 1). The upper portion of shaft 20 is provided with a spiral groove 25 adapted to cooperate with an inwardly projecting pin 26 in the tubular portion of the piston. Through this pin and spiral groove connection the shaft 20 is rotated upon reciprocation of the piston.

The piston is urged upwardly in the cylinder by a coil spring 27 disposed in the cylinder below the piston, as shown. The spring 27 normally holds the piston in its uppermost position against an adjustable stop screw 28 in the top of the cylinder. A fluid under pressure, preferably compressed air, is employed to move the piston downwardly against the opposing force of the spring. The compressed air may be introduced into the upper end of the cylinder through a pipe 29 provided with a suitable manually or automatically operated valve 19, whereby compressed air may be admitted to and exhausted from the upper end of the cylinder.

A sleeve 30 is fixed to the shaft 20 intermediate its ends and at its lower end the sleeve is formed with an outwardly projecting flange 31 which is adapted to engage the underside of bearing 15 and thereby limit the upward movement of the shaft. The sleeve 30 extends upwardly through the bearing 15 and is of such length that its upper end is slightly above the upper surface of the bearing when the shaft is in its lowermost position, as shown in Fig. 3. Immediately below the sleeve 30, a collar 32 is loosely mounted on the shaft and a coil spring 33 is interposed between the collar and the lower bearing 18. The spring 33 serves to normally hold the shaft and collar in their uppermost positions, as shown in Fig. 2.

The shaft 20 is formed at its lower end with a concentric tubular or sleeve-like portion 34 within which a winding arbor or mandrel 35 is slidably mounted. A pin 36 is fixed to the mandrel and projects therefrom into a vertical slot 37 in the tubular portion of the shaft. This pin and slot connection permits a limited amount of vertical movement of the shaft with respect to the mandrel and insures rotation of the mandrel with the shaft. A coil spring 38 is provided within the upper end of the tubular portion of the shaft. This spring serves to normally hold the mandrel in its lowermost position with respect to the shaft, as shown in Fig. 2. In this position the lower end of the mandrel projects below the lower end of the shaft. The projecting lower end portion of the mandrel is preferably serrated or knurled, as indicated at 39, for a purpose which will presently be apparent.

The supporting bracket 16 is formed at its left end (Figs. 2 and 3) with a forwardly projecting flange 40 provided with a solder wire guiding passage 41. A similar guide passage 42 is provided in the bearing 18 in line with the passage 41 and tangential to the knurled lower end 39 of the mandrel, as shown in Fig. 4. Between the guide passages 41 and 42, the solder wire is guided by a semi-circular groove 44 (Fig. 5) in a forwardly projecting ledge 46 of the supporting bracket. Means is provided for intermittently feeding the free end of a continuous length of solder wire 48 through the guide passage 41, along guide groove 44, and then through guide passage 42 to the knurled end of the mandrel. This means comprises a spring finger 50 attached to the forward end of a slide 51 having a rearwardly projecting flange 52 (Fig. 5) adapted to slide in a guide groove 53 provided in the supporting bracket 16. A semi-circular wire receiving groove 54 is provided on the bottom edge of the slide.

During the movement of the slide toward the mandrel the spring finger 50 frictionally engages the solder wire and feeds it forwardly, but when the slide is retracted, the finger slides freely along the solder wire. The slide is urged forwardly by a coil spring 56 and is retracted by an oscillatory member 57, which is pivoted at 58 to the supporting bracket and has a depending portion 59 operatively engaging a slot 60 in the slide. A link 62 operatively connects the slide operating member 57 with the collar 32, so that when the collar is moved downwardly to the position shown in Fig. 3, the pivoted member 57 is actuated to retract the slide. A pin and slot connection 64 is provided between the member 57 and connecting link 62, whereby the collar 32 is free to move upwardly to the position shown in Fig. 2, while the slide and pivoted member are permitted to remain in the positions shown in Fig. 3 until the shaft 20 arrives at its uppermost position.

The operation of the apparatus is as follows:

With the shaft 20 in its uppermost position, as shown in Figs. 1 and 2, the free end of the solder wire 48 is advanced through the guide passage 42 into the cylindrical space 60 immediately below the tubular lower end of the shaft. The forward end of the solder wire is thus slightly squeezed between the knurled surface of the mandrel and the inner cylindrical surface of the bearing 18, since the wall thickness of the tubular portion 34 of the shaft is slightly less than the diameter of the solder wire. Then, by manual or automatic operation of the valve 19, air under pressure is admitted through the pipe 29 into the upper end of the cylinder, whereupon the piston 22 is moved downwardly, compressing the spring 27. Due to the pin and spiral groove connection between the piston and the shaft 20, the latter is rotated by the downward movement of the piston. The mandrel 35 rotates with the shaft, causing the end portion of the solder wire to be wound around the lower end of the mandrel, the knurled surface of which prevents slippage between the mandrel and the solder wire. The shaft and mandrel are rotated approximately one complete revolution, which is sufficient to wind a complete ring 62 of solder wire around the knurled portion of the mandrel. The lower end of the depending tubular portion of the piston then engages the upper end of sleeve 30, thus moving the shaft 20 and collar 32 downwardly to the positions in which they are shown in Fig. 3. As the collar moves downwardly, the wire feeding finger 50 is retracted to the position in which it is shown in Fig. 3. As the shaft moves downwardly, the lower end thereof moves across the inner end of guide passage 42, thus severing the formed ring of solder wire from the continuous length. The mandrel moves downwardly with the shaft until its movement is arrested by a stop pin or abutment 65, whereupon further downward movement of the shaft causes the tubular portion 34 thereof to telescope the knurled portion of the mandrel and thereby strip the formed ring of solder wire therefrom. The valve 19 is then operated to exhaust the compressed air from the upper end of the cylinder, whereupon the piston 22 is returned to its original position by spring 27, and the shaft 20 and collar 32 are returned by spring 33 to their original positions, as shown in Figs. 1 and 2. Simultaneously therewith the mandrel 35 is returned by spring 38 to its original position, as shown in Fig. 2. As soon as the mandrel and shaft have returned to their original positions, the previously severed end of the continuous length of solder wire is again fed forwardly by the spring actuated feed finger into position to be engaged by the knurled portion of the mandrel, thus completing one cycle of operation of the apparatus.

When, as in the illustrated embodiment of the invention, the solder rings are formed for the purpose of soldering a nut to a metal strip, the metal strip may be placed on a suitable support 66 so that the solder ring will drop and be properly positioned thereon when it is stripped from the arbor, as shown in Fig. 3. The support conveniently may comprise a conveyor or rotary carrier having a series of work holding positions adapted to be successively indexed to the solder ring receiving station. At each work receiving position a stop pin, such as 65, and suitable means for receiving and locating a metal strip, such as 12, may be provided. After receiving a ring of solder the metal strip may be indexed to another station where a nut may be placed over the ring of solder, as shown in Fig. 7. At still another work station, the metal strip, nut and solder ring may be heated sufficiently to complete the soldering of the nut to the metal strip.

It is to be understood that the invention is not limited to the particular embodiments thereof herein illustrated and described, but is capable of other applications within the scope of the appended claims.

What is claimed is:

1. In a wire forming apparatus, a rotatable and endwise movable shaft having a tubular end portion, a mandrel slidably keyed within said tubular portion and having a wire forming portion normally projecting beyond the tubular end of said shaft, and means for rotating the shaft and thereby the mandrel to form a wire on the said portion of the mandrel and for thereafter imparting an endwise movement to the shaft to strip the formed wire from the mandrel.

2. In a wire forming apparatus, a rotatable mandrel, reciprocatory means for feeding an end portion of a continuous length of wire to said mandrel, means comprising a reciprocatory member for rotating the mandrel to wind the end portion of the wire thereon, resilient means for moving the wire feeding means in one direction, and means responsive to a movement of the reciprocatory member for moving the wire feeding means in the opposite direction.

3. In a wire forming apparatus, a support having a circular aperture therein and a wire guiding passage communicating with said aperture, a shaft having a tubular end portion slidable and rotatable in said aperture, a mandrel slidably keyed within the tubular end of said shaft and having a wire forming portion projecting beyond said tubular end, means for feeding an end portion of a continuous length of wire through said guide passage to the projecting portion of the mandrel, and means for rotating said shaft and mandrel to wind said end portion of the wire upon said mandrel and for thereafter imparting an endwise movement to said shaft to sever the wound portion of the wire from the continuous length thereof.

4. In a wire ring forming apparatus, a support having a circular aperture therein and a wire guiding passage communicating with said passage, a shaft having a tubular end portion slidable and rotatable in said aperture, a mandrel slidably keyed within said tubular portion and projecting beyond the free end thereof, means normally holding the shaft in a position in which the inner end of the wire guiding passage is open to said aperture and the projecting end of said mandrel is adapted to receive a wire fed through said guide passage, means for feeding the free end of a continuous length of wire through said guide passage to said projecting end of mandrel, and means for rotating the shaft and thereby the mandrel for winding approximately one complete turn of the wire around the projecting end of the mandrel and for thereafter imparting an endwise movement to said shaft to sever said turn of wire from the continuous length and strip it from said mandrel.

5. In an apparatus for forming rings of solder wire from a continuous length of solder wire, a rotatable and reciprocable shaft having a tubular end portion, a mandrel slidably keyed within said tubular portion and normally projecting beyond the free end thereof, means for feeding the free end of a continuous length of solder wire to the projecting portion of said mandrel, and means for rotating the mandrel to form a ring of solder wire thereon and for thereafter imparting an endwise movement to said shaft to sever the formed ring of solder wire from the continuous length and strip it from the mandrel.

6. In a wire forming apparatus, a rotatable shaft having a tubular end portion, a mandrel slidably keyed with said tubular portion and having a wire forming portion normally projecting beyond the tubular end of said shaft, and means for rotating the shaft and thereby the mandrel to form a wire on said portion of the mandrel and for thereafter effecting relative endwise movement between the shaft and mandrel to strip the formed wire from the mandrel.

7. In a wire forming apparatus, a rotatable and endwise movable mandrel, a support for said mandrel having a wire guiding passage disposed substantially tangential to said mandrel, means for feeding an end portion of a continuous length of wire through said guide passage to said mandrel, and means for rotating the mandrel to wind the end portion of wire thereon and for thereafter imparting an endwise movement to said mandrel across said guide passage to sever the wound portion of the wire from the continuous length thereof.

8. In a wire forming apparatus, a rotatable and endwise movable shaft having a tubular end portion, a mandrel slidably keyed within said tubular portion and having a wire forming portion normally projecting beyond the tubular end of said shaft, means for feeding an end portion of a continuous length of wire to said wire forming portion of the mandrel, means for rotating the shaft and thereby the mandrel to wind said end portion of the wire on the said portion of the mandrel and for thereafter imparting an endwise movement to said shaft and mandrel to sever the wound portion of the wire from the continuous length thereof, and means for thereafter interrupting the endwise movement of the mandrel while the endwise movement of the shaft continues to thereby strip the wound portion of the wire from the mandrel.

HOMER W. LARSON.